(12) United States Patent
Yoon et al.

(10) Patent No.: US 7,391,144 B2
(45) Date of Patent: Jun. 24, 2008

(54) CARBON-BASED COMPOSITE PARTICLE FOR ELECTRON EMISSION DEVICE, AND METHOD FOR PREPARING

(75) Inventors: Tae-Ill Yoon, Seoul (KR); Jong-Woon Moon, Busan (KR); Sung-Hee Cho, Seoul (KR); Sung-Kee Kang, Yongin (KR); Hun-Young Kim, Seoul (KR); Hyun-Jung Lee, Yongin (KR)

(73) Assignee: Samsung SDI Co., Ltd., Suwon-si (KR)

( * ) Notice: Subject to any disclaimer, the term of this patent is extended or adjusted under 35 U.S.C. 154(b) by 158 days.

(21) Appl. No.: 10/821,266

(22) Filed: Apr. 8, 2004

(65) Prior Publication Data

US 2004/0263044 A1 Dec. 30, 2004

(30) Foreign Application Priority Data

Apr. 8, 2003 (KR) .................... 10-2003-0021996

(51) Int. Cl.
*H01J 1/304* (2006.01)
*H01J 1/14* (2006.01)

(52) U.S. Cl. .................. 313/311; 313/310; 313/495

(58) Field of Classification Search ......... 313/309–311, 313/495
See application file for complete search history.

(56) References Cited

U.S. PATENT DOCUMENTS 6,239,547 B1 * 5/2001 Uemura et al. ............... 313/495
6,628,053 B1 * 9/2003 Den et al. .................... 313/310
6,835,330 B2 * 12/2004 Nishino et al. ............... 252/503
6,891,320 B2 * 5/2005 Nakamoto .................... 313/311
6,897,603 B2 * 5/2005 Mao et al. .................... 313/311
7,202,586 B2 * 4/2007 Okubo ......................... 310/253
7,239,073 B2 * 7/2007 Takikawa et al. ............. 313/495
2006/0065543 A1 * 3/2006 Arai et al. .................... 205/577

FOREIGN PATENT DOCUMENTS

JP 2000-36243 2/2000
JP 2000-223004 8/2000
KR 2000-0074609 12/2000

OTHER PUBLICATIONS

Patent Abstract of Japan 2000-036243, dated Feb. 2, 2000, in the name of Kamimura, et al.
Patent Abstract of Japan 2000-223004, dated Aug. 11, 2000, in the name of Jin, et al.
Korean Patent Abstract 1020000074609, dated Dec. 15, 2000, in the name of Choi.

* cited by examiner

*Primary Examiner*—Karabi Guharay
(74) *Attorney, Agent, or Firm*—Christie, Parker & Hale, LLP

(57) ABSTRACT

A carbon-based composite particle for an electron emission source comprises a particle of a material selected from the group consisting of metals, oxides, and ceramic materials; and a carbon-based material such as a carbon nanotube which is partially embedded inside the particle and which partially protrudes from the surface of the particle.

22 Claims, 6 Drawing Sheets

CARBON-BASED COMPOSITE PARTICLE FOR ELECTRON EMISSION DEVICE, AND METHOD FOR PREPARING

CROSS-REFERENCE TO RELATED APPLICATION

This application claims priority of Korean Patent Application No. 2003-21996 filed on Apr. 8, 2003 in the Korean Intellectual Property Office, the entire disclosure of which is incorporated herein by reference.

BACKGROUND OF THE INVENTION (a) Field of the Invention

The present invention relates to a carbon-based composite particle for an electron emission display device and a method for preparing the same, and, more particularly, to a carbon-based composite particle having a high level of electron emission and a method for preparing the same.

(b) Description of the Related Art

Earlier field emission displays (hereinafter referred to as "FED") were made of a spindt-type electron emission source including Mo or Si, with sharp tips of sub-micron size. Since the spindt-type electron emission source is assembled with sharp tips of a sub-micron size, the method of fabricating the same requires a great deal of attention, and such an operation is considered high-level precision work. Therefore, it is difficult and expensive to produce a large-sized field emission display device according to this method.

Carbon material has recently emerged as a potentially useful electron emission source due to its low work function. One carbon material, a carbon nanotube (CNT), is particularly expected to be an ideal electron emission source since it features a high aspect ratio and a small tip radius of curvature of 100 Å, and thereby electrons are readily emitted by applying an external voltage of as low as 1~3 V/μm.

Generally, the electron emission source is fabricated in such a manner that the carbon nanotubes are formed in a paste with a solvent, a resin, and so on, the paste is applied between substrates by a screen-printing method, and then it is sintered. Since the carbon nanotubes have a low work function, the resultant electron emission source can be driven by applying low voltages, and the method of fabricating the same is not complicated. It will thereby offer advantages for large size panel displays.

However, when the electron emission source is produced with carbon nanotubes by the screen-printing method, each carbon nanotube is roughly mixed with a solid powder present in the paste and irregularly distributed in the solid powder, so that the tips of most of the carbon nanotubes are covered by the solid powder. In addition, most of carbon nanotubes are oriented in a direction parallel with the substrate instead of the direction perpendicular to the substrate which is where the electro-field is applied. Accordingly, the ratio of carbon nanotubes incapable of emitting electrons to all carbon nanotubes is increased so that the electron emission capabilities are not fully utilized. Generally, an electron emission cathode fabricated by such method has a planar shape so that the surface area is minimized.

Therefore, there are considerable demands to find a way to expose the tips of the carbon nanotubes. As one scheme to satisfy such demands, Korean laid-open patent publication No. 2000-74609 discloses that carbon nanotubes are admixed to metal powders. However, this method requires an additional process to expose and align the carbon nanotubes, rendering the process overly complicated. Further, it is difficult to align many carbon nanotubes perpendicularly, and only a few metal particles have been observed to have carbon nanotubes on the surface thereof.

Further, Japanese laid-open patent publication No. 2000-223004 discloses a method for exposing the carbon nanotubes in which carbon and the metal particulate are mixed and compacted, then the compacted mixture is cut and selectively etched. However, this method is also quite complicated and is difficult to apply to a field emission device of an electron emission array.

Moreover, Japanese laid-open patent publication No. 2000-36243 discloses a method in which a laser beam is irradiated on the surface of a printed pattern in which carbon nanotubes are covered with silver particles combined with a binder, and the silver particles and the binder present on the surface are selectively removed, so that the carbon nanotubes are exposed. However, such laser irradiation can tend to thermally damage the carbon nanotubes.

SUMMARY OF THE INVENTION

According to an embodiment of the present invention, a composite particle for electron emission is provided in which many of the electron emission sources are provided in a direction perpendicular to a substrate.

In another embodiment of the invention, a method is set forth for preparing composite particles for electron emission.

In still another embodiment of the invention, a composition is set forth for forming an emitter of an electron emission display device using the composite particles for the electron emission.

According to yet another embodiment of the invention, an electron emission display device is provided in which the electron emission is initiated at low operation power and the electron emission characteristics are improved.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

The present invention relates to a carbon-based composite particle for electron emission comprising a particle selected from the group consisting of metals, oxides, ceramic materials, and combinations thereof; and a carbon-based material which is partially buried inside of the particle and which partially protrudes from the surface of the particle.

In one embodiment of the invention, a method is provided for preparing a carbon-based composite particle for electron emission comprising: a) dissolving a metal particle precursor in a solvent to obtain a solution; b) adding a carbon-based material to the solution and mixing the solution; c) reducing the metal particle precursor to produce and grow a metal particle, wherein the carbon-based material is partially buried inside of the metal particle and partially protrudes from the surface of the metal particle.

In yet another embodiment of the invention, an electron emission source is provided comprising the carbon-based composite particle.

In still another embodiment of the invention, a composition is provided for forming an electron emission emitter comprising the carbon-based composite particle.

In still another embodiment of the invention, a field emission display is provided comprising an electron emission source formed by print-coating the composition for forming the electron emission emitter.

Also, the present invention relates to a composite particle for an electron emission source, comprising: a particle comprising a material selected from the group consisting of metals, oxides, ceramic materials, and combinations thereof; and a material of a cylindrical shape which is partially embedded within the particle and which partially protrudes from the surface of the particle.

Hereinafter, the present invention is described with reference to the drawings in a more detailed manner.

Figure 1:
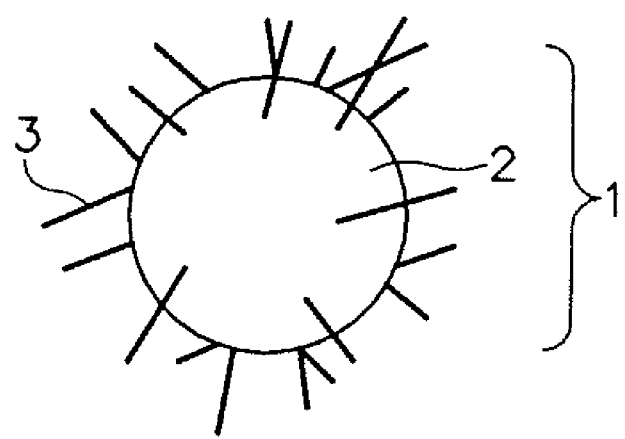
FIG. 1 is a schematic view of a composite particle for electron emission according to the present invention.

As shown FIG. 1, a carbon-based composite particle 1 for electron emission has a structure in which a carbon-based material 3 partially protrudes from the surface of a particle 2. The particle 2 is composed of a material selected from the group consisting of metals, oxides, ceramic materials, and combinations thereof. The particle acts as an effective supporter for the carbon-based material, and thereby the number of emitters for electron emission is increased. In a preferred embodiment of the present invention, the carbon-based material preferably occupies at least 30% of the surface area of the composite particle, and more preferably between 50 and 90% of the surface area. When the carbon-based material occupies less than 30% of the surface area of the composite particle, too few electrons are emitted to ensure intensity.

The metal, the oxide, or the ceramic material may comprise Ag, Al, Ni, Cu, Zn $SiO_2$, MgO, $TiO_2$, and similar materials, and is preferably Ag. The carbon-based material preferably has a cylindrical shape. Examples include carbon nanotubes, diamond, diamond-like carbon, graphite, carbon black, and so on.

According to the present invention, the carbon-based composite particle is one in which the carbon material partially protrudes from the surface of the particle, and is partially buried inside of the particle. Thereby, upon applying the composite particle of the present invention to the emitter pattern, the amount of carbon-based material exposed on the surface and also presented in a direction perpendicular to the substrate is increased so that the carbon-based material can provide more electronic field effects.

In addition, since a particle composed of a material selected from the group consisting of metals, oxides, ceramic materials, and combinations thereof can have a surface roughness on the order of a nanometer to a micrometer, the entire surface area accommodating the carbon-based material is substantially enlarged. This advantageously increases the electron emission effects and the emission current density. In a preferred embodiment of the present invention, the electron emission source comprising a plurality of the composite particles has a surface roughness of at least 10 Å, and preferably between 10 Å and 10 μm. In addition, when the composite particle comprises a metal particle and a carbon-based material, the electric conductivity is improved to reduce the turn-on voltage and the operation voltage.

The carbon-based composite particle may be prepared by any one of a number of methods including co-precipitating, sol-gelling, or thermal decomposing.

In order to prepare the composite particle in which the carbon-based material partially protrudes from the surface of the metal particle, the co-precipitating method is typically employed. That is, the metal particle precursor (e.g., metal salt) is dissolved in a solvent, and a carbon-based material is dispersed thereto. The metal particle precursor is reacted in the presence of a catalyst such as a reducing agent to produce a metal particle which is then grown. During growth of the metal particle, the carbon-based material is partially buried therein, yet remains partially protruding from the surface, rendering a composite particle of the present invention.

The type of the metal salt used in the co-precipitating process may be selected depending upon the metal without specific limitation. However, it is preferably a nitrate or a sulfate.

Figure 2:
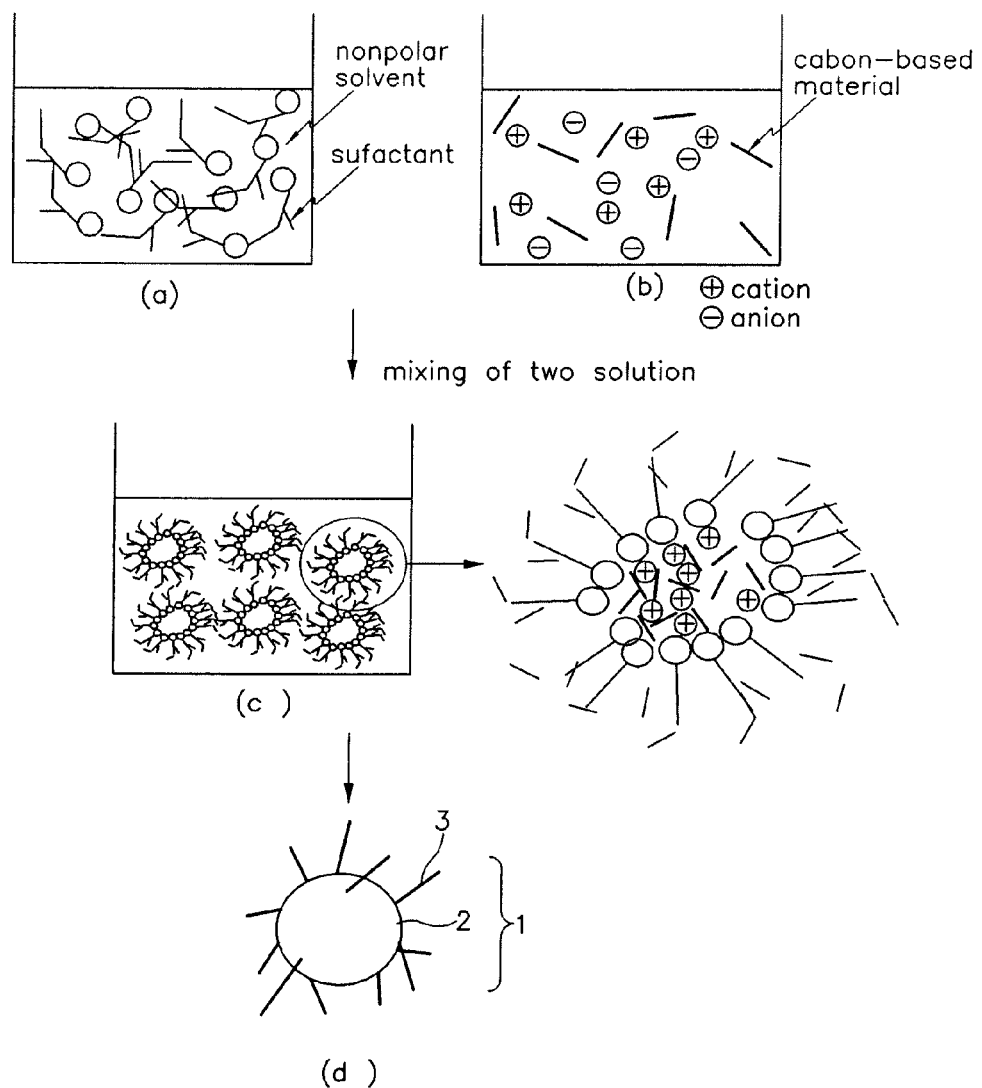
FIG. 2 is a process flow chart showing a preparation method for a composite particle according to one embodiment of the present invention.

According to the method for preparing the composite particles of the present invention, the size of the composite particles can be uniformly controlled from several nanometers to several tens of micrometers. FIG. 2 shows a process flowchart of the method for preparing the composite particles. The process comprises a) dispersing a surfactant in a nonpolar solvent to provide a first solution; b) dissolving a metal salt in a nonpolar solvent and dispersing a carbon-based material thereto to provide a second solution; c) mixing the first solution and the second solution to form a micelle or a reverse micelle and adding a reducing agent to produce and grow a metal particle; and d) heating the micelle or the reverse micelle to remove the nonpolar solvent and the surfactant to provide composite particles in which the carbon-based material is bound with the metal particles. In the method, the particle size is uniformly controlled by forming a micelle or a reverse micelle, to provide uniform photoemission. Further, since the particle size of the composite particle is remarkably reduced, it is possible to provide a display device having a high resolution.

The size of the composite particles can be controlled by adjusting the concentration ratio of the first solution and the second solution. The concentration ratio of the first solution to the second solutions is preferably within the range of 1:0.5-30.

The surfactant preferably has a polar head and a nonpolar tail. Preferred surfactants are cationic, anionic, amphionic, and nonionic surfactants. The polar head preferably has a nonionic group capable of hydrogen binding or an ionic group capable of electrostatic binding. Surfactants having ionic groups may include, but are not limited to, one or more of sulfonates ($RSO_3$—), sulfates ($RSO_4$—), carboxylates ($RCOO$—), phosphates ($RPO_4$—), ammoniums ($R_xH_yN^+$:

where x is 1-3 and y is 3-1), quaternary ammoniums ($R_4N^+$), betaines ($RN^+(CH_3)_2CH_2COO^-$), and sulfobetaines ($RN^+(CH_3)_2CH_2SO_3^-$). In the above compound, R is a saturated or unsaturated hydrocarbon group, and is preferably a saturated or unsaturated hydrocarbon having a carbon number between 2 and 1000. Surfactants having nonionic groups may include, but are not limited to, polyethylene oxides, polypropylene oxides, block copolymers of the form $(EO)_l(PO)_m(EO)_l$ where EO is ethylene oxide and PO is propylene oxide, and where l and m are between 1 and 500, amine compounds, gelatins, polyacrylate-based resins, polyvinylchlorides (PVC), acrylonitrile/butadiene/styrene (ABS) polymers, acrylonitrile/styrene/acryl ester (ASA) polymers, mixtures of acrylonitrile/styrene/acryl ester (ASA) polymer and propylene carbonate, styrene/acrylonitrile (SAN) copolymers, and methyl methacrylate/acrylonitrile/butadiene/styrene (MABS) polymers.

The anion bound to the metal ion is preferably removed prior to the micelle formation. The reducing agent reducing the metal ion to a metal particle may include $NaBH_4$. The heating temperature for removing the nonpolar solvent and the surfactant is preferably between 200 and 300° C.

In order to prepare the inorganic composite particle from the surface of which the carbon-based material protrudes, a sol-gelling process is typically employed. A silicon alkoxide such as $Si(OCH_3)_4$ or $Si(OC_2H_5)_4$ is subjected to hydrolysis with water using a catalyst such as hydrochloric or nitric acid and is subjected to polymerization and condensation reactions, then the metal particle having a desired particle size is obtained. When a carbon-based material is added to the reaction, a composite particle can be obtained in which the carbon-based material is partially embedded within the particle and partially protrudes from the surface thereof.

Figure 3:
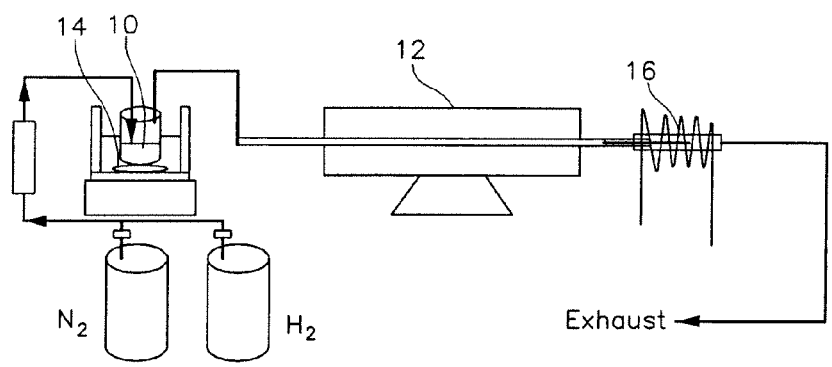
FIG. 3 is a schematic view of a device used for preparing the composite particle according to one embodiment of the present invention.

If a spray pyrolysis method is used, it can be applied to both a composite particle having a metal particle and a composite particle having an inorganic particle. A detailed description thereof is as follows, in which spray pyrolysis is carried out by using a device shown in FIG. 3.

The method comprises a) dispersing a carbon-based material in a solution 10 of a metal particle precursor to provide a dispersed solution; b) generating a droplet using the dispersed solution; and c) passing the droplet instantaneously through a high temperature tubular reactor 12 using an inert carrier gas, to pyrolize the droplet. As a result, the particle size of the obtained composite particle can be controlled to the order of several micrometers and comprises a carbon-based material which is partially embedded in the metal particle or the inorganic particle and which partially protrudes from the surface of the particle.

The precursor solution preferably comprises 0.001 to 10M of the metal particle precursor or the inorganic particle precursor. The metal particle precursor is preferably a salt of a metal such as Ag, Al, Ni, Cu, or Zn. The inorganic particle precursor may include a silicon alkoxide.

Further, the concentration of the carbon-based material is preferably 0.00001 to 100 g/liter. The solvent for forming the precursor solution may include water or an organic solvent. The organic solvent is preferably an alcohol such as ethanol, and it may have an acid added thereto.

Figure 4:
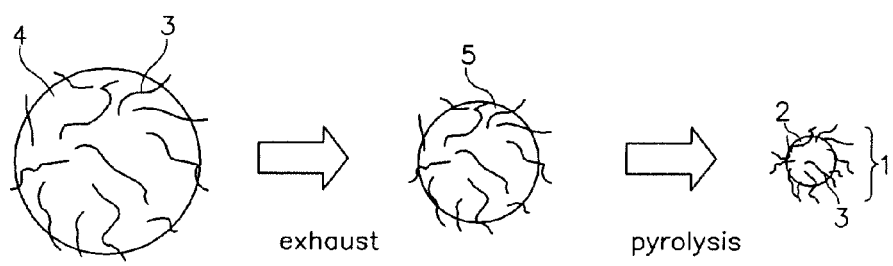
FIG. 4 is a process flow chart showing a preparation method for a composite particle according to another embodiment of the present invention.

The formation of the droplet 14 is achieved by an ultrasonic sprayer, a nozzle device, or a gaseous sprayer. As shown in FIG. 4, the obtained droplet 14 having a particle size of about 10 to 20 micrometers is shrunk to a solid particle precursor 5 by instantaneous evaporation upon passing through the high-temperature tubular reactor. The particular precursor is subsequently pyrolized to generate a composite particle in which the carbon based material 3 is partially impregnated in a needle shape.

The temperature of the tubular reactor is maintained at between 200 and 1000° C., and preferably between 500 and 1000° C. in order to carry out the evaporation of the droplet and the pyrolysis of the particular precursor. All components other than the particle material are completely removed using the gas. It is preferable to introduce a hydrogen gas as a reducing agent together with a carrier gas in order to protect the carbon-based material from the gas generated upon the pyrolysis. The composite particle generated by being instantaneously pyrolized in the high temperature tubular reactor is filtered with a filter 16 and collected at the end of the tubular reactor.

To fabricate an emitter for electron emission from the composite particles according to the present invention, a paste is made from a mixture of the composite particles, a binder resin, a glass frit, and an organic solvent. The paste is then printed on a substrate to provide an electron emission source. The composite particles in the composition are present in an amount between 0.01 and 50% by weight, preferably between 0.5 and 20% by weight in the composition. The composite particles are preferably mixed with the glass frit in a ratio of between 5:1 and 1:1.

The binder resin preferably includes an acrylic resin, an epoxy-based resin, a cellulose-based resin, or similar resins or combinations of resins, and suitable organic solvents include butyl carbitol acetate (BCA), terpineol (TP), or similar solvents or combinations of solvents.

As required, the composition may further comprise a photosensitive resin and a UV initiator. The viscosity of the paste composition is preferable between 5000 and 100,000 cps.

The paste composition is printed on the substrate and heated to apply to an electron emission source for a display having a desirable shape. The heating process may be carried out in vacuum or under a gas atmosphere. The gas atmosphere may include gases such as $N_2$ gas, or inert gases. Suitable print processes of the electron emission source include spin coating, screen printing, roll coating, and similar processes.

Figure 5A:
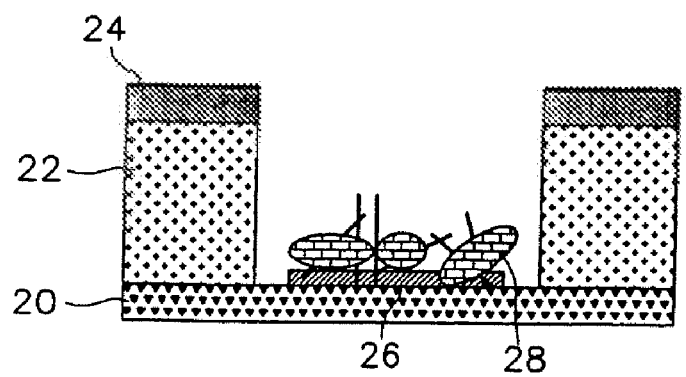
FIG. 5A is a cross-sectional view of a cathode employing conventional carbon nanotubes.

FIG. 5A shows a cross-sectional view of the conventional cathode for electron emission formed from the paste composition comprising a conventional carbon-based material, a binder resin, glass frit, and a solvent. As shown in FIG. 5A, the conventional cathode is applied to an emission display constructed from a cathode electrode 20, an insulator 22, a gate electrode 24, and a glass frit 26 which is provided to anchor the carbon-based material. However, little of the carbon-based material remains on the glass frit 26, while contaminants 28 occupy the most part of the glass frit 26. The contaminants seem to be generated by combusting the resin of the paste.

Figure 5B:
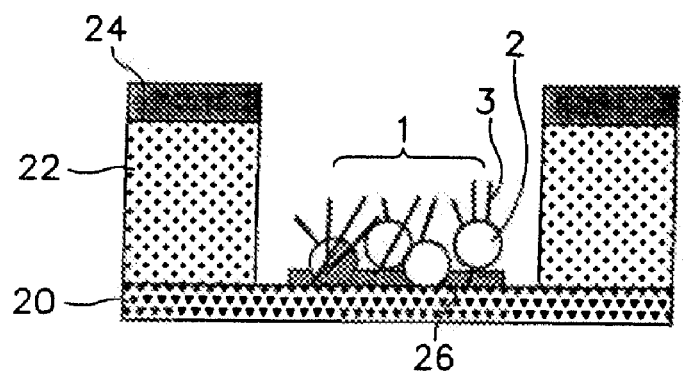
FIG. 5B is a cross-sectional view of a cathode employing the composite particle of the present invention.

FIG. 5B shows a cross-sectional view of the cathode for electron emission of the present invention. As shown in FIG. 5B, the cathode is applied to an emission display constructed from a cathode electrode 20, an insulator 22, and a gate electrode 24. In the composite particle 1 of the present invention, since the particle 2 acts as a support for the carbon material 3, a significant amount of carbon material protrudes from the particle surface permitting it to effectively emit electrons.

Figure 6:
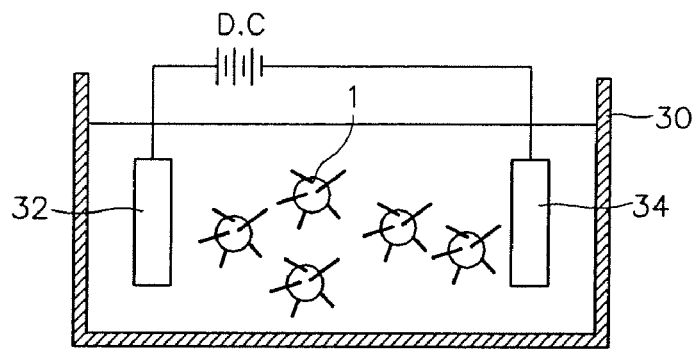
FIG. 6 is a schematic view showing a process for fabricating a cathode according to one embodiment of the present invention.

Since the composite particle according to the present invention is a conductive material, the electron emission source is obtained by electrophoresis resulting from an electronic field applied between the electrode and the patterned substrate. As shown in FIG. 6, the composite particle, a solvent, and a surfactant (dispersing agent) are mixed to obtain a dispersed solution. The dispersed solution is then introduced to an ultrasonic container 30 and treated with ultrasound. In the ultrasonic container, an electrode plate 32 and a patterned cathode electrode 34 are installed with a certain distance from one another, and a bias voltage controlled by the external terminal is applied thereto for a period of time from 1 second to several minutes to deposit the composite particles 1 on the cathode electrode. Subsequently, the substrate is washed with a solvent and dried to provide an electron emission source. Upon employing the above method, since the heating process is omitted, the electron emission source is more easily prepared compared to that of a thick film printing process. The surfactant used in the above method may be the one used in preparing the composite particle.

The following examples illustrate embodiments of the present invention in further detail. However, it is understood that the present invention is not limited by these examples.

Figure 8:
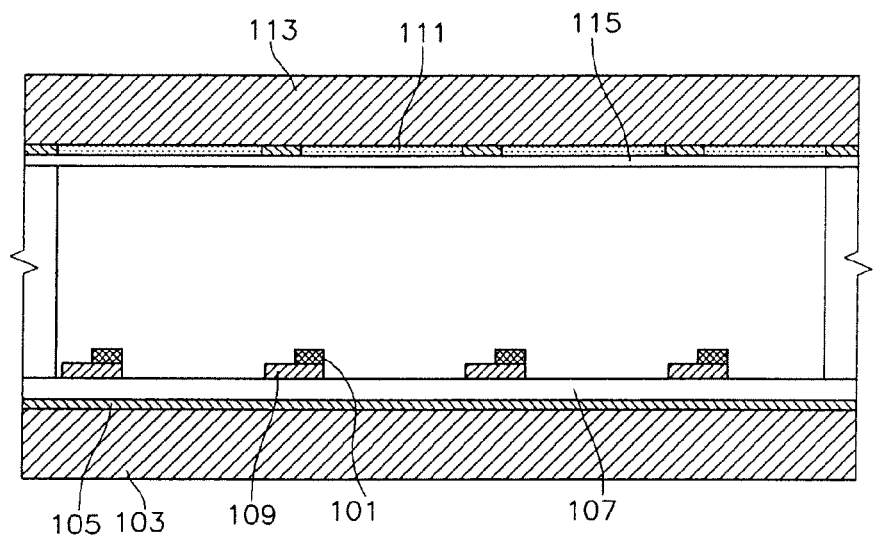
FIG. 8 is a partial sectional view of a field emission display according to the invention.

A field emission display with the inventive cathode is illustrated in FIG. 8. With reference to FIG. 8, gate electrodes 105 are first formed on a substrate 103 on which emitters 101 are to be formed. An insulation layer 107 is formed on the gate electrode 105, and cathode electrodes 109 are formed on the insulation layer 107. The emitters 101 are formed on the cathode electrodes 109. Further, phosphor layers 111 are formed on a front substrate 113 on which an anode electrode 115 is formed from a metal material such as Al, for example.

Figure 9:
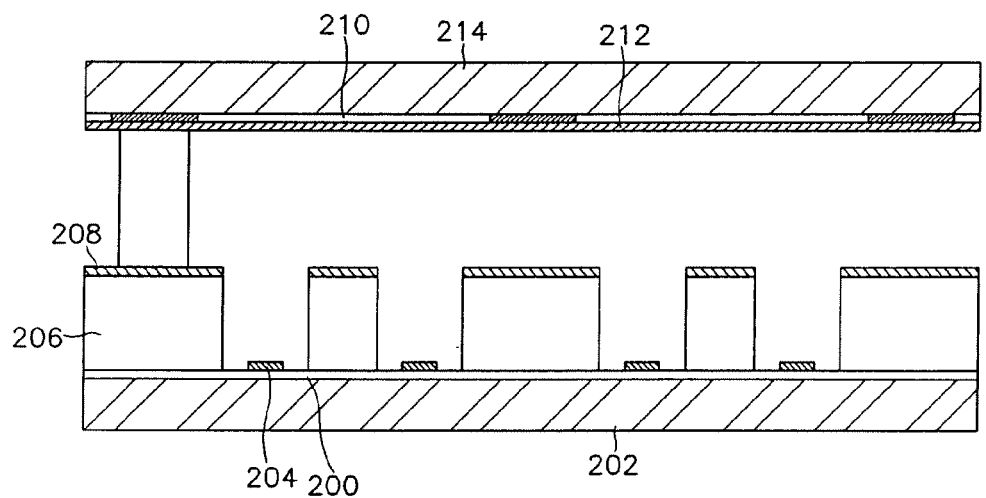
FIG. 9 is a partial sectional view of a field emission display according to another embodiment of the invention.

FIG. 9. illustrates another field emission display with the inventive cathode. As shown in FIG. 9, a cathode electrode 200 is formed on a rear substrate 202, the cathode electrode formed as a plurality of line patterns. An emitter 204 is provided on the cathode electrode 200. An insulating layer 206 is disposed on the surface of the rear substrate 202 to cover the cathode electrode 200 except the emitter 204. A gate electrode 208 is formed on the insulating layer 206 except over the emitter 204 and has a structure of plural line patterns. Further, phosphor layer 210 and an anode electrode 212 are formed on a front substrate 214 spaced a predetermined distance from the rear substrate 202, and having the same structure as the phosphor layer 111 and anode electrode 115 of FIG. 8.

EXAMPLE 1

Preparation of Composite Particles 40 g of $AgNO_3$, 1 g of $NH_4OH$, 2 g of $NaBH_4$, and 0.5 g of carbon nanotubes were mixed to generate and grow Ag particles. On growing the Ag particles, the carbon nanotubes were partially impregnated in the particle such that they partially protruded from the surface of the particles so as to produce composite particles.

EXAMPLE 2

Preparation of Composite Particles 5 wt % polyacrylate resin was dispersed in a nonpolar solvent to obtain a first solution. 5 wt % of carbon nanotubes were dispersed in a nonpolar solvent containing $AgNO_3$ to obtain a second solution. The first solution was mixed with the second solution at a ratio of 1:20 to provide a reverse micelle in which Ag ions and carbon nanotubes co-existed in a certain concentration. A reducing agent was added thereto and the number of Ag ions were reduced to produce and grow Ag particles. Carbon nanotubes dispersed in the reverse micelle were bound with the grown Ag particles. The solution comprising the reverse micelle was heated at 200° C. to remove the solvent and the polyacrylate resin. Consequently, Ag-CNT composite particles were obtained.

EXAMPLE 3

Preparation of Composite Particles

Carbon nanotube (CNT) powder was dispersed in 0.1M of an $AgNO_3$ aqueous solution in a concentration of 0.5 g/100 ml to provide a solution. The device shown in FIG. 3 was employed to prepare composite particles of Example 3. The resultant solution was agitated to uniformly disperse the CNT powder, followed by generating droplets using the ultrasonic spray device. The generated droplets were introduced into a tubular reactor 12 at 400° C. at a flow rate of 1 liter/min using $N_2$ as a carrier gas. The droplets were instantaneously evaporated in the tubular reactor 12 to be shrunk to solid particles. Thereafter, the particles were pyrolized to generate Ag particles from $AgNO_3$, and the remaining components were removed as $N_2$, NO, or $NO_2$ gas or vapor, and as CO or $CO_2$ gas. In order to protect the CNT from the oxygen generated from the vapor or $NO_x$ gas, 5% diluted $H_2$ gas was further introduced as a reducing agent. Ag particles generated by the instantaneous pyrolysis in the tubular reactor were filtered and collected with a paper filter at the end of the tubular reactor to provide Ag-CNT composite particles.

EXAMPLE 4

Preparation of the Electron Emission Source

The composite particles obtained from Example 1 were mixed with the glass frit in a ratio of 2.5:1, and was subjected to a ball mill. Then, a vehicle in which ethyl cellulose was dissolved in terpineol solvent was added thereto and agitated to provide a paste composition. The composite particles in the paste composition were dispersed with a 3-roll mill. Then, the composition was screen-printed on the substrate and dried, exposed with a light, and developed to form a pattern. This was followed by sintering at 600° C. to provide an electron emission source.

EXAMPLE 5

Preparation of the Electron Emission Source

The composite particles obtained from Example 1, a dispersing agent (polyacrylate resin), and pure water were mixed to provide a dispersed solution. The obtained dispersed solution was introduced in an ultrasonic container 30 as shown in FIG. 6 and subjected to ultrasonic treatment. An electrode plate 32 and a patterned cathode electrode 34 were installed at a given distance from one another in the container 30. A bias voltage controlled by the external terminal was applied for 1 second to several minutes to deposit the composite particle to the cathode electrode 34. Thereafter, the substrate was washed with pure water and dried to provide an electron emission source.

COMPARATIVE EXAMPLE 1

Preparation of the Electron Emission Source

The electron emission source was fabricated by the same method as in Example 4, except that CNTs were used instead of the composite particles of Example 1.

Figure 7:
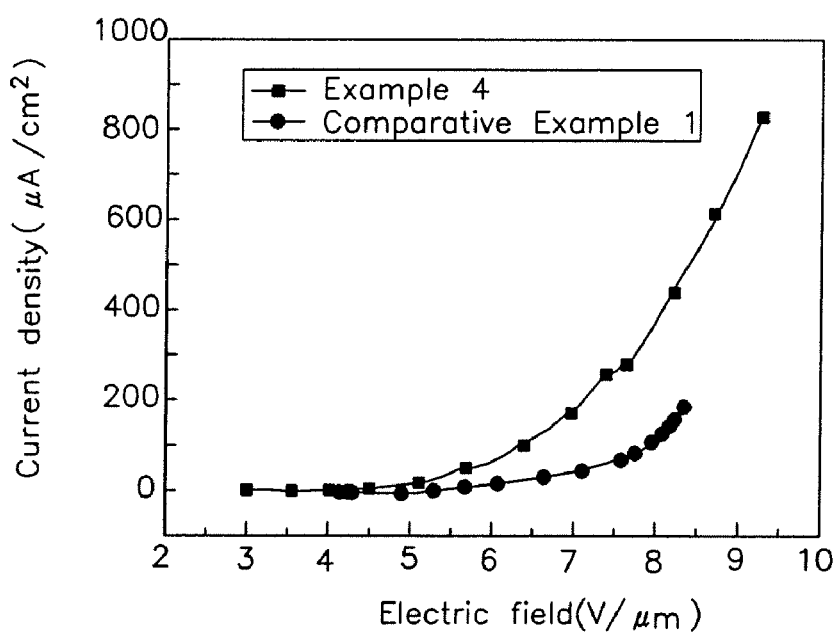
FIG. 7 is a graph showing the electron emission of cathodes according to Example 4 and Comparative Example 1 at different external electric field strengths.

The electron emission sources of Example 4 and Comparative Example 1 were measured as to electron emission amounts depending upon the strength of an external electric field, and the results are shown in FIG. 7. It was found that the cathode of Example 4 could initiate the electron emission at a lower operation voltage compared to that of Comparative Example 1. This is understood to be because the contacting resistance is lowered by the composite particles of Example 1 in which the carbon-based material is partially impregnated within the particles.

Referring again to FIG. 1, for composite particle 1 for the electron emission source of the display of the present invention, the particle 2 acts as a support of the carbon-based material 3, so that many carbon based materials 3 protrude from the surface of the particle 2 to effectively emit electrons. Further, since the circular composite particles are provided in a certain area, the surface becomes uneven. The surface area that is capable of accommodating electron emission sources is thereby increased to increase the emitted current density per unit electric field. Further, the current amount per electron emission source is minimized to prolong the life of the display device.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A carbon-based composite particle for an electron emission source, comprising:
    a particle comprising a material selected from the group consisting of metals, oxides, ceramic materials, and combinations thereof; and
    a carbon-based material which is partially embedded within the particle and which partially protrudes from the surface of the particle.

2. The carbon-based composite particle for an electron emission source according to claim 1, wherein the particle is selected from the group consisting of Ag, Al, Ni, Cu, Zn, $SiO_2$, MgO, $TiO_2$, and $Al_2O_3$.

3. The carbon-based composite particle for an electron emission source according to claim 1, wherein the carbon-based material is selected from the group consisting of carbon nanotubes, diamond, diamond-like carbon, graphite, and carbon black.

4. The carbon-based composite particle for an electron emission source according to claim 1, wherein the carbon-based material occupies at least 30% of the entire surface area of the composite particle.

5. An electron emission source comprising a plurality of carbon-based composite particles according to claim 1.

6. The electron emission source according to claim 5, wherein the electron emission source has a surface roughness of at least 10 Å.

7. The electron emission source according to claim 6, wherein the electron emission source has a surface roughness of between 10 Å and 10 µm.

8. A composition for forming an electron emission emitter comprising a plurality of carbon-based composite particles according to claim 1.

9. A field emission display device comprising an electron emission source prepared by print-coating the composition for forming an electron emission emitter according to claim 8.

10. An electron emission source of a field emission display device comprising an aggregate of carbon-based composite particles, each comprising:
    a particle comprising a material selected from the group consisting of metals, oxides, ceramic materials and combinations thereof; and
    a carbon-based material which is partially embedded within the particle and which partially protrudes from the surface of the particle.

11. The electron emission source according to claim 10, wherein the particle is selected from the group consisting of Ag, Al, Ni, Cu, Zn, $SiO_2$, MgO, $TiO_2$, and $Al_2O_3$.

12. The electron emission source according to claim 10, wherein the carbon-based material is selected from the group consisting of carbon nanotubes, diamond, diamond-like carbon, graphite, and carbon black.

13. The electron emission source according to claim 10, wherein the carbon-based material occupies at least 30% of the entire surface area of the composite particle.

14. The electron emission source according to claim 10, wherein the electron emission source has a surface roughness of between 10 Å and 10 *.

15. The electron emission source according to claim 10, wherein the electron emission source has a surface roughness of at least 10 Å.

16. A composite particle for an electron emission source, comprising:
    a particle comprising a material selected from the group consisting of metals, oxides, ceramic materials, and combinations thereof; and
    a material of a cylindrical shape which is partially embedded within the particle and which partially protrudes from the surface of the particle.

17. The composite particle for an electron emission source according to claim 16, wherein the particle is selected from the group consisting of Ag, Al, Ni, Cu, Zn, $SiO_2$, MgO, $TiO_2$, and $Al_2O_3$.

18. The composite particle for an electron emission source according to claim 16, wherein the material of a cylindrical shape is one or more nanotubes.

19. The composite particle for an electron emission source according to claim 16, wherein the material of a cylindrical shape occupies at least 30% of the entire surface area of the composite particle.

20. An electron emission source comprising a plurality of the composite particles according to claim 16.

21. The electron emission source according to claim 20, wherein the electron emission source has a surface roughness of at least 10 Å.

22. The electron emission source according to claim 16, wherein the electron emission source has a surface roughness of between 10 Å and 10 µm.

* * * * *